United States Patent
Okajima et al.

(10) Patent No.: US 6,843,470 B2
(45) Date of Patent: Jan. 18, 2005

(54) AIR DIFFUSER AND FLUSHING METHOD THEREOF

(75) Inventors: Yasunobu Okajima, Osaka (JP); Tatsuya Uejima, Osaka (JP); Masaaki Nagano, Osaka (JP); Kiyoshi Izumi, Osaka (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 10/182,564
(22) PCT Filed: Nov. 26, 2001
(86) PCT No.: PCT/JP01/10297
§ 371 (c)(1),
(2), (4) Date: Jul. 22, 2002
(87) PCT Pub. No.: WO02/45833
PCT Pub. Date: Jun. 13, 2002

(65) Prior Publication Data
US 2003/0001295 A1 Jan. 2, 2003

(30) Foreign Application Priority Data

Dec. 4, 2000 (JP) .......................... 2000-367855
Dec. 22, 2000 (JP) .......................... 2000-389657
Dec. 22, 2000 (JP) .......................... 2000-389658

(51) Int. Cl.[7] .................................................. B01F 3/04
(52) U.S. Cl. ...................... 261/65; 261/121.1; 261/124; 261/DIG. 70
(58) Field of Search ........................ 261/63, 65, 69.1, 261/121.1, 124, DIG. 70

(56) References Cited

U.S. PATENT DOCUMENTS 4,474,714 A    10/1984  Downs ........................ 261/124
5,348,650 A  * 9/1994   Cummings, Jr. ............ 210/199
6,475,395 B1 * 11/2002  Schmit et al. ............... 210/741

FOREIGN PATENT DOCUMENTS

| DE | 813995 | 9/1951 |
| JP | 56013087 A | 2/1981 |
| JP | 58-141796 | 9/1983 |
| JP | 62-258729 | 11/1987 |
| JP | 63-77525 | 4/1988 |
| JP | 63-137741 | 6/1988 |
| JP | 64-36099 | 3/1989 |

* cited by examiner

Primary Examiner—Scott Bushey
(74) Attorney, Agent, or Firm—Kusner & Jaffe

(57) ABSTRACT

An air diffuser (2) having a diffuser tube (5) immersed sidewardly in a tank (1), a flushing pipe (9) opening at its tip an outlet (11) at an upper position of the diffuser tube, and a flushing valve (12) disposed in the flushing pipe (9). The diffuser tube (5) is made up of a main pipe (6) communicated at its basal end to an air supply source (8) and communicated at its tip to the flushing pipe (9), and a plurality of branch pipes (7) being communicated to the main pipe (6) and opening at their tip as a blowhole (10) at a lower position of the main pipe (6). During air diffusion, air is supplied from the air supply source (8) with tile flushing valve (12) closed, and the air is diffused from the blowholes (10). During flushing, air is supplied from the air supply source (8) with the flushing valve (12) opened and an intra-tank mixed liquor is sucked from the openings of the diffuser tube (5), thereby flushing the inside of the diffuser tube (5) with the sucked intra-tank mixed liquor. The intra-tank mixed liquor is then joined with air to come off together from the outlet (11) of the flushing pipe (9). Air diffusion from the blowholes (10) and the flushing of the diffuser tube (5) are alternately repeated by utilizing pulsation to be caused by pressure variations in the diffuser tube (5).

9 Claims, 6 Drawing Sheets

AIR DIFFUSER AND FLUSHING METHOD THEREOF

TECHNICAL FIELD

The present invention relates to an air diffuser and a method of flushing an air diffuser and, in particular, to techniques of aerating an intra-tank mixed liquor in membrane separation activated sludge process.

BACKGROUND ART

Membrane separators used in membrane separation activated sludge process for biologically treating waste water, drainage water etc have a plurality of membrane cartridges. As shown in FIG. 11, a membrane cartridge 51 has filtration membranes 53 disposed on the front and rear surfaces of a filter supporting plate 52 made of resin, and the entire peripheral portions of the filtration membranes 53 are fused to the filter supporting plate 52 by heating with a heater or by ultrasonic vibration. A transmitted liquor passage is present between the filter supporting plate 52 and each filtration membrane 53. A collecting hole 54 communicated to the transmitted liquor passage extends from front to rear of the filter supporting plate 52. A transmitted liquor outlet 55 communicated to the collecting hole 54 is disposed at an upper end of the filter supporting plate 52.

In the membrane separator, the plural membrane cartridges 51 are oriented vertically and in parallel with one another to form a passage between the adjacent membrane cartridges 51. Each membrane cartridge 51 is connected to a passage for discharging the transmitted liquor via a tube connected to the transmitted liquor outlet 55. In the membrane separator, the filtration membranes 53 perform filtration by using a differential pressure between membranes that is exerted between the front and rear of each filtration membrane 53. The membrane separator can be operated by forced suction system of applying driving pressure as the suction pressure exerted by a suction pump, or gravity filtration system of applying driving pressure as the water head in the tank.

The membrane separator has an air diffuser disposed under the membrane cartridges 51. For example, the air diffuser is obtained only by boring a plurality of holes of approximately φ10 mm in a lower part of a pipe made of vinyl chloride.

In membrane separation activated sludge process, the membrane separator is immersed in an aeration tank, and an intra-tank mixed liquor containing the activated sludge in the aeration tank is aerated by the air diffused from the air diffuser. The diffused air generates an upstream of gas-liquid-solid mixed phase by air lift action. The upstream supplies the intra-tank mixed liquor to the filtration membranes 53 of the membrane cartridges 51 of the membrane separator, and the filtration membranes 53 performs crossflow filtration of the intra-tank mixed liquor. The crossflow of the upstream of the intra-tank nixed liquor on the membrane surfaces enables to suppress cake from attaching to the membrane surfaces of the filtration membranes 53 and flush the membrane surfaces.

Flushing of the membrane surfaces in the membrane separator requires air supply of averaging not less than 10 L/min for every membrane cartridge 51. Unless the air is supplied uniformly to the entire membrane surfaces of the membrane cartridges 51, the local area of the filtration membranes 53 receiving much air is subjected to a large load, which lowers the lifetime of the membranes. On the other hand, the local area of the filtration membranes 53 receiving less air fails to obtain a sufficient flushing effect, which accelerates the attachment of cake to the membrane surfaces.

Supplying a predetermined amount of air from the air diffuser ensures oxygen necessary for biological treatment in membrane separation activated sludge process. The predetermined amount of air is set based on the efficiency of oxygen dissolution into activated sludge. Increasing the efficiency of oxygen dissolution is desirable for achieving power saving that is realized by downsizing a blower supplying air to the air diffuser and reducing its driving time.

Therefore, it can be considered that a uniform dispersion of the diffused air and improvement in the efficiency of oxygen dissolution are achieved by arranging blowholes having a small diameter at a plurality of locations of the air diffuser. With this air diffuser, it is however difficult to completely avoid that the blowholes and a diffuser tube become clogged by activated sludge. When the air diffuser becomes clogged, it is difficult to perform biological treatment with activated sludge. It follows that the filtration membranes 53 of the membrane cartridges 51 in the membrane separator become clogged by the cake attached to the membrane surfaces. This impairs the function of the membrane separator.

It is therefore necessary to flush the air diffuser in a periodic maintenance as measure to prevent clogging of the air diffuser. This flushing is usually performed about one time for two weeks. Letting water in the diffuser tube of the air diffuser flushes the diffuser tube. To perform such flushing, it is however necessary to place ancillary facility such as a flushing water tank and a flushing pump.

In the membrane separator, the operation of the suction pump is stopped when the waste water flow is reduced and the amount of waste water in the tank is below a predetermined water level. In gravity filtration type that uses the water head in the tank as a driving pressure, the operation stops spontaneously when the amount of flow is reduced and the water head is lower than a predetermined value.

The amount of waste water flowing to the waste water treatment facility is not always constant. That is, the facility receiving a large daily variation or seasonal variation may have little or no daily amount of waste water flow in some cases and have an excessively large daily amount in some cases. Therefore, with respect to the aeration tank of a general waste water treatment facility, the ratings of the tank capacity and the air diffuser are set in such a redundant specification as to comply with an abnormally large waste water flow.

This contributes to a considerable variation of water level in the aeration tank between the time of a maximum load and the time of a minimum load of waste water flow. At the time of a low load, the operation of the membrane separator is brought to a stop. When the aeration of activated sludge with the air from the air diffuser is stopped for a long period of time, there may occur oxygen deficiency and insufficient stirring of the intra-tank mixed liquor. It is therefore necessary that only air diffusion operation for diffusing air from the air diffuser be performed in the state of stopping filtration operation of the membrane separator. However, this operation state causes damage to the filtration membranes 53 of the membrane cartridges 51.

On the other hand, during the period of time that the operation of the air diffuser is stopped, sludge flows to the diffuser tube through the blowholes. This sludge is dried with air during air diffusion operation, and the dried sludge causes clogging of the blowholes.

Accordingly, the present invention has for its object the provision of an air diffuser and a method of flushing an air diffuser that can structurally suppress a clogging of a diffuser tube and flush the diffuser tube by a simple manipulation.

DISCLOSURE OF INVENTION

To solve the foregoing problems, an air diffuser according to a first aspect of the invention comprises a diffuser tube having at its lower part a plurality of blowholes and being communicated at its basal end to an air supply source, the diffuser tube being immersed sidewardly in a tank; a flushing pipe being communicated at its basal end to a tip of the diffuser tube and opening at its tip as an outlet at an upper position of the diffuser tube; and a flushing valve disposed in the flushing pipe.

With this construction, during air diffusion operation, the flushing valve is closed so that the air to be supplied from the air supply source to the diffuser tube at a predetermined pressure is sprayed from the blowholes. This air aerates the intra-tank mixed liquor and supplies oxygen for biological treatment. This air also produces by its air lift action an upstream to stir the intra-tank mixed liquor, and acts as a traction on the membrane surfaces of a membrane separator, thereby flushing the membrane surfaces.

During flushing operation, the flushing valve is opened so that the air to be supplied from the air supply source is discharged from the outlet via the flushing pipe under atmospheric pressure or a predetermined depth.

At this time, the outlet is opened under atmospheric pressure or the predetermined depth. Thereby, the pressure within the diffuser tube is lowered and the back pressure in the outlet corresponds to the atmospheric pressure or the predetermined depth pressure. It follows that the back pressure of the blowholes locating below the outlet is greater than the back pressure of the outlet. As a result, the air within the diffuser tube flows to the outlet and the intra-tank mixed liquor flows from the blowholes to the diffuser tube that is low in pressure. The intra-tank mixed liquor running in the diffuser tube and the air pass through the diffuser tube and flush the diffuser tube. This intra-tank mixed liquor is then joined with sludge within the diffuser tube to enter the flushing pipe and come off together from the outlet.

To the inner surface of the diffuser tube, sludge is attached which enters the diffuser tube when the operation of the air diffuser is stopped, and which is then dried by air passing through the diffuser tube during air diffusion. Infiltration of the intra-tank mixed liquor facilitates the release of the dry sludge from the inner surface of the diffuser tube. The released sludge is joined with the intra-tank mixed liquor to come off together from the outlet as the air is discharged.

In the foregoing action, when the intra-tank mixed liquor rapidly runs in the diffuser tube that is low in pressure via the blowholes, the resistance of the intra-tank mixed liquor increases the pressure within the diffuser tube to stop the flow of the intra-tank mixed liquor into the diffuser tube, and therefore, the intra-tank mixed liquor flowing from the diffuser tube to the flushing pipe is discharged from the outlet by air lift action. Thereby, the pressure within the diffuser tube is lowered and the intra-tank mixed liquor runs in the diffuser tube via the blowholes. The result of this is that pulsation occurs in the diffuser tube and the flushing pipe.

At the occurrence of pulsation, the pressure within the diffuser tube varies with repeated subjection to sharp increase and decrease. This produces intermittent occurrences of a flushing state that the intra-tank mixed liquor flows to the diffuser tube via the blowhole, and an air diffusion state that the flow of the intra-tank mixed liquor into the diffuser tube is stopped and part of the air blows off via the blowholes.

At the point that the air diffusion state changes to the flushing state, a rapid flow of the intra-tank mixed liquor occurs in the diffuser tube. Repeated occurrences of the rapid flow increases the effect of flushing the sludge attached to the inside of the diffuser tube.

An air diffuser according to a second aspect of the invention comprises: a diffuser tube immersed sidewardly in a tank; a flushing pipe opening at its tip as an outlet at an upper position of the diffuser tube; and a flushing valve disposed in the flushing pipe, the diffuser tube consisting of (i) a main pipe being communicated at its basal end to an air supply source and being communicated at its tip to the flushing pipe, and (ii) a plurality of branch pipes being communicated to the main pipe and opening at their tip as a blowhole at a lower position of the main pipe.

With this construction, air diffusion operation and flushing operation are performed in the same manipulation as in the first aspect. During air diffusion operation, the air to be supplied to the diffuser tube passes through the main pipe to the branch pipes, and the air blows out from the blowholes disposed at the tip of the branch pipes. During flushing operation, the intra-tank mixed liquor flows from the blowholes to the branch pipes. This intra-tank mixed liquor is joined with air to pass through the branch pipes to the main pipe while flushing the inside of the diffuser tube, and then joined with cumulus deposit within the diffuser tube to come off together from the outlet via the flushing pipe.

Since the opening at the tip of the branch pipes serves as the blowhole, the inside diameter of the branch pipes and the aperture of the blowhole are the same. This provides a shape having no variations in the sectional area of the passage. Also, there is no resistance to obstruct the fluid passing from the branch pipes via the blowholes to the exterior. Therefore, the sludge and intra-tank mixed liquor that remain in the branch pipes when changing from the flushing state to the air diffusion state, are quickly discharged to the outside of the branch pipes at the time of air diffusion. Otherwise, the resulting effects are the same as the first aspect.

An air diffuser according to a third aspect of the invention comprises: a diffuser tube immersed sidewardly in a tank; a flushing pipe opening at its tip as an outlet at an upper position of the diffuser tube; and a flushing valve disposed in the flushing pipe, the diffuser tube consisting of (i) a main pipe communicated at its basal end to an air supply source and communicated at its tip to the flushing pipe, and (ii) a plurality of branch pipes being communicated to the main pipe and having at their upper side a plurality of blowholes of which aperture is smaller than the opening at their tip.

With this construction, air diffusion operation and flushing operation are performed in the same manipulation as the first aspect. During air diffusion operation, the air to be supplied to the diffuser tube passes through the main pipe to the branch pipes and then blows off from the blowholes of the respective branch pipes. The air passing through the branch pipes receives buoyancy due to a density difference with the intra-tank mixed liquor. Therefore, most of the air blows off from the blowholes, and the rest is discharged from the opening at their end. Since the blowholes have a small aperture, the small bubble (fine bubble) of the air blowing off therefrom have a small diameter, which increases the efficiency of oxygen dissolution. In addition, even if the blowholes spontaneously become clogged by sundry matter, sludge of low flowability, large flock and the like, a predetermined amount of air for aeration is ensured by the air blowing off from the opening at the tips of the branch pipes.

During flushing operation, the intra-tank mixed liquor flows from the opening at the tip of the branch pipes and from the blowholes to the branch pipes. This intra-tank mixed liquor is joined with air to pass through the branch pipes to the main pipe while flushing the inside of the diffuser tube, and then joined with cumulus deposit within the diffuser tube to come off together from the outlet via the flushing pipe. Otherwise, the resulting effects are the same as the first aspect.

A preferred air diffuser of the invention has a sensor means to measure the water level in the tank, and a control means to open the flushing valve at a particular time when the sensor means detects that the water level is below a predetermined value.

With this construction, the control means can switch air diffusion operation and flushing operation by opening/closing the flushing valve. At such a particular time that the amount of waste water flowing to the tank is below the predetermined value, flushing operation can be performed automatically. Flushing operation performed at that particular time prevents excessive air diffusion and also performs flushing of the diffuser tube. Further, even if a slight flow of waste water continues for a long period of time, the intra-tank mixed liquor is stirred in the air diffusion state to be produced intermittently, and oxygen can be supplied to activated sludge. In addition, in the flushing state, the intra-tank mixed liquor is joined with air to flow together through the diffuser tube and flushing pipe, so that sufficient oxygen is dissolved in the intra-tank mixed liquor. Therefore, by returning the intra-tank mixed liquor discharged from the flushing pipe to the inside of the tank, the oxygen supply to the intra-tank mixed liquor and the stirring of the intra-tank indexed liquor are performable even in the flushing state.

Other preferred air diffuser of the invention has a control means to open the flushing valve at predetermined time-spaced intervals at which a timer is set.

With this construction, the control means performs switching between the air diffusion operation and the flushing operation by opening/closing the flushing valve. The flushing operation is performed automatically at predetermined time-spaced intervals, thereby flushing the inside of the diffuser tube in the flushing state to be produced intermittently, while ensuring a minimum required amount of air diffusion in the air diffusion state to be produced intermittently.

According to a method of flushing an air diffuser of the invention, during air diffusion, air is supplied from an air supply source with a flushing valve closed and the air is diffused from blowholes, and, during flushing, air is supplied from the air supply source with the flushing valve opened and an intra-tank mixed liquor is sucked from each opening of a diffuser tube, so that the inside of the diffuser tube is flushed with the sucked intra-tank mixed liquor, and the intra-tank mixed liquor is then joined with the air to come off together from an outlet of a flushing pipe.

According to a preferred method of flushing an air diffuser of the invention, the air diffusion from the blowholes and the flushing of the diffuser tube are alternately repeated by utilizing pulsation to be caused by pressure variations in the diffuser tube during flushing.

These and other objects, features, aspects and advantages of the present invention will become more apparent from the following detailed description of the present invention when taken in conjunction with the accompanying drawings.

BEST MODE FOR CARRYING OUT THE INVENTION

First Preferred Embodiment

Figure 1:
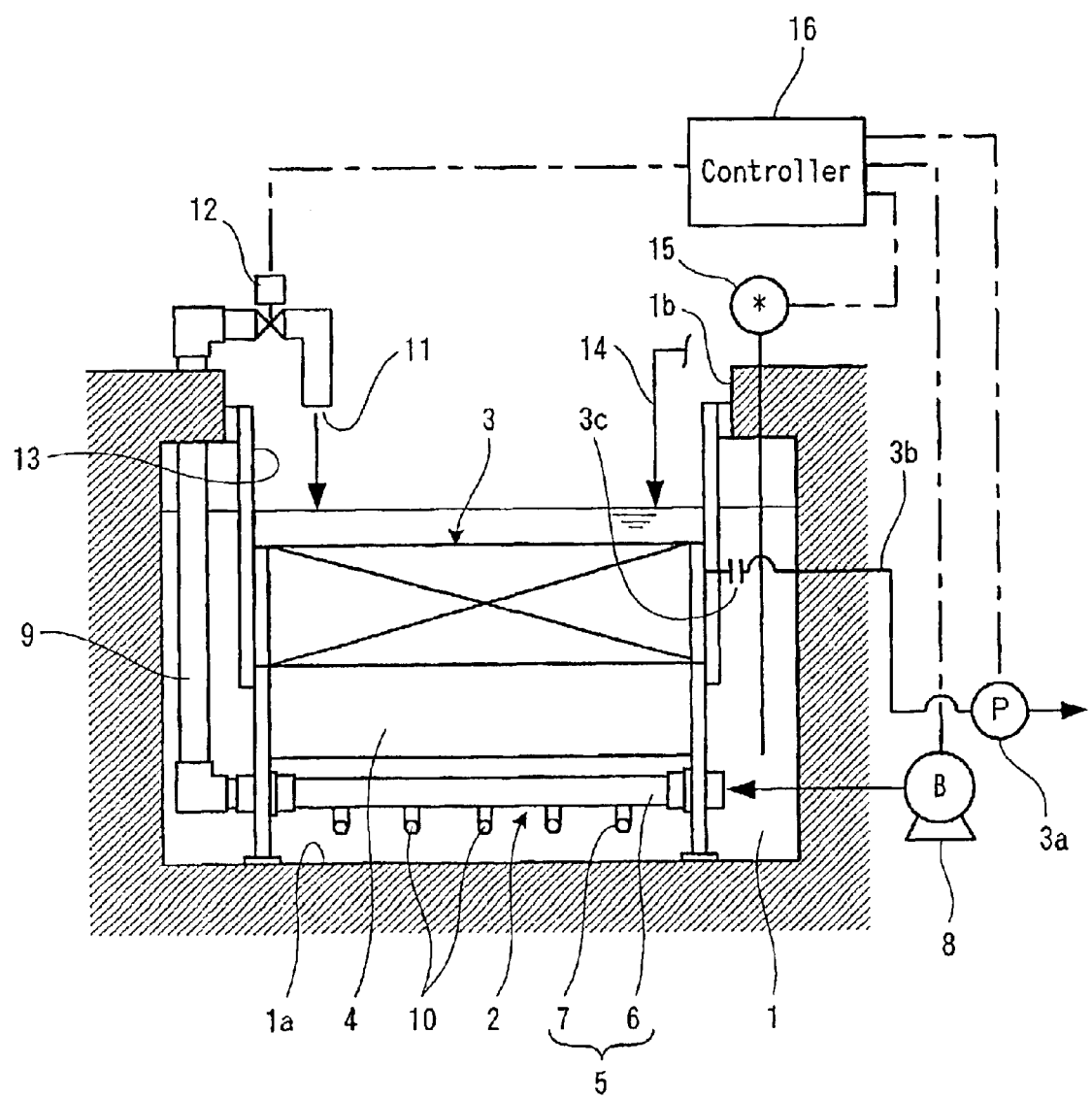
FIG. 1 is a schematic diagram showing a membrane separation activated sludge treatment facility using an air diffuser of one preferred embodiment of the invention.
Figure 2:
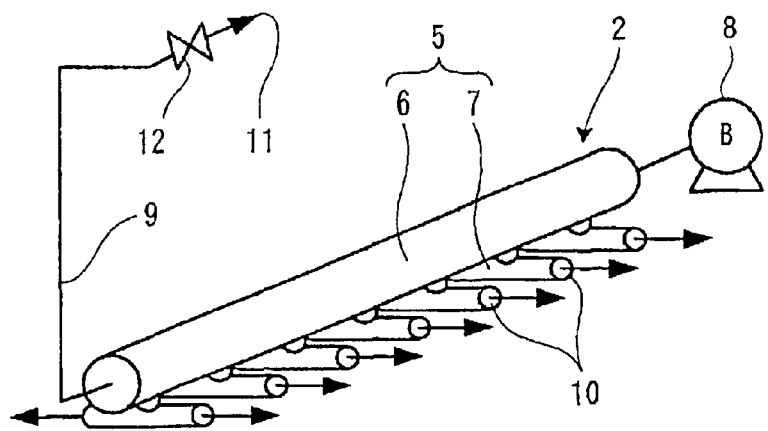
FIG. 2 is a perspective view of a diffuser tube in FIG. 1.
Figure 3:
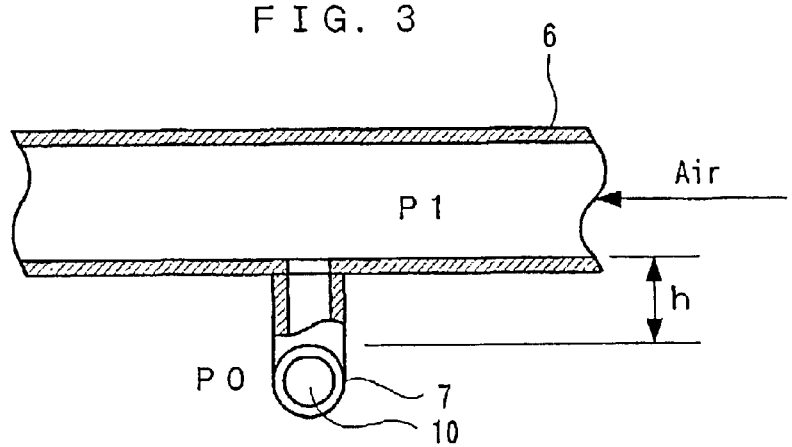
FIG. 3 is a sectional view of an important part of the diffuser tube.

A first preferred embodiment will be described below based on the accompanying drawings. Referring to FIGS. 1 to 3, an air diffuser 2 and a membrane separator 3 disposed above the air diffuser 2 are immersed in an aeration tank 1 for performing membrane separation activated sludge treatment. A variety of separation membranes, such as organic flat membrane type, tube type and ceramic type, are usable for the membrane separator 3. Hereat, there are used a plurality of membrane cartridges using organic flat membrane type separation membrane (filtration membrane), as shown in FIG. 1. The membrane cartridges are oriented vertically and in parallel with each other at predetermined spaced intervals to form a passage between the adjacent membrane cartridges. The membrane separator 3 is removably connected via a coupling 3c to a passage 3b provided with a suction pump 3a, and is activated by a pump suction pressure as a driving pressure. As the driving pressure, the water head in the tank (gravity) can be used.

A diffuser casing 4 of the air diffuser 2 is disposed below the membrane separator 3 so as to surround its lower region, and a diffuser tube 5 is located at a lower position of the diffuser case 4. The diffuser tube 5 is made up of a main pipe 6 composed of a large-diameter pipe having a predetermined aperture and extending horizontally, and a plurality of branch pipes 7 formed by small-diameter pipes, each having a predetermined aperture and locating underneath the main pipe 6.

The main pipe 6 is communicated at its basal end to a blower 8 that is an air supply source, and is connected at its tip to a flushing pipe 9 extending vertically. Each branch pipe 7 is in an inverted T-shape and communicated, at one end of its upper part, to the main pipe 6. Both ends of each branch pipe 7, which are located beneath the main pipe 6, form a blowhole 10. Instead of being restricted to the above construction, the diffuser tube 5 can have various constructions as shown in FIGS. 4 to 10. The details will be discussed later.

The tip of the flushing pipe 9 is opened at an upper position of the main pipe 6, as an outlet 11. A flushing valve 12 is interposed in the flushing pipe 9. In the first preferred embodiment, the outlet 11 is opened under atmospheric pressure above water surface. The outlet 11 can be placed under water surface. The diffuser case 4 is fixed to a tank bottom face 1a. The membrane separator 3 can move up and down along a guide 13 disposed between the diffuser case 4 and a tank opening 1b.

In the aeration tank 1, there are a waste water supply pipe 14 supplying waste water and a water level gauge 15 measuring the water level of the aeration tank 1. The water level gauge 15 and an arithmetic circuit contained in a controller 16 form a sensor means for detecting the amount of waste water flow. In the arithmetic circuit of the controller 16, the current waste water flow is obtained by calculating a displacement of water level in unit time based on the output value of the water level gauge 15, and dividing the displacement by the area of the tank bottom of the aeration tank 1.

The controller 16 has a function of opening the flushing valve 12 at a particular time that the amount of waste water flow is below a predetermined value, or at predetermined time-spaced intervals at which a self-contained timer is set. This function is embodied by an electric circuit, an integrated circuit, or a program stored on a semiconductor device. The controller 16 also controls start/stop of the suction pump 3a and the blower 8.

The operation in the above construction will be described below. During normal air diffusion operation, the controller 16 closes the flushing, valve 12 so that air having a predetermined pressure is supplied from the blower 8 to the diffuser tube 5. The air passes through the main pipe 6 to the respective branch pipes 7, and then blows off from the blowholes 10 to the intra-tank mixed liquor in the aeration tank 1.

This diffused air aerates the intra-tank mixed liquor and also generates an upstream of gas-liquid-solid mixed phase. The upstream stirs by its lift the intra-tank mixed liquor and supplies the intra-tank mixed liquor to the passage between the adjacent membrane cartridges of the membrane separator 3, as the crossflow. The membrane separator 3 performs filtration by allowing the intra-tank mixed liquor to pass through the filtration membranes of the membrane cartridges. The upstream flows, as a traction, on the membrane surfaces, thereby suppressing cake from attaching to the membrane surfaces of the membrane cartridges.

The controller 16 measures continuously the amount of waste water flow based on the value obtained by the water level gauge 15, and performs flushing operation at a particular time that the amount of waste water flow from the waste water supply pipe 14 is below a predetermined value, or performs flushing operation at predetermined spaced-time intervals at which the timer is set.

In the former flushing operation, the controller 16 stops the suction pump 3a to stop the operation of the membrane separator 3. In the latter flushing operation, the controller 16 provides a continuous operation of the membrane separator 3.

In both flushing operations, the controller 16 opens the flushing valve 12, so that the air supplied from the blower 8 to the main pipe 6 of the diffuser tube 5 passes through the flushing pipe 9 and comes off from the outlet 11 under atmospheric pressure.

At this time, the outlet 11 is opened under atmospheric pressure at an upper position of the main pipe 6, and the blowholes 10 of the branch pipes 7 in the diffuser tube 5 are opened at a lower position of the main pipe 6. As a result, the main flow of the air passing through the main pipe 6 of the diffuser tube 5 flows to the outlet 11 that has a smaller back pressure and a smaller resistance than the blowholes 10.

Therefore, as shown in FIG. 3, with respect to pressure P0 exerted on the blowholes 10 of the branch pipes 7 (which is determined by the water level in the tank), pressure (static pressure) P1 exerted on the main pipe 6 is lowered and the intra-tank mixed liquor passes through the blowholes 10 to the branch pipes 7 and the inside of the main pipe 6.

The intra-tank mixed liquor running in the diffuser tube 5 flushes the sludge attached to the inside of the branch pipes 7 and the inside of the main pipe 6. This intra-tank mixed liquor then joins with the air passing through the main pipe 6 to enter the flushing pipe 9 to come off from the outlet 11.

To the inner surface of the diffuser tube 5, sludge is attached which enters the diffuser tube 5 when the operation of the blower 8 of the air diffuser 2 is stopped, and which is then dried by the air passing through the diffuser tube 5 during air diffusion. Infiltration of the intra-tank mixed liquor facilitates the release of the dry sludge from the inner surface of the pipe. The released sludge is joined with the intra-tank mixed liquor to come off together from the outlet 11 as the air is discharged.

When the intra-tank mixed liquor rapidly runs in the diffuser tube 5 that is low in pressure via the blowholes 10, the resistance of the intra-tank mixed liquor increases the pressure within the diffuser tube 5 to stop the flow of the intra-tank mixed liquor into the diffuser tube 5. The intra-tank mixed liquor flowing from the diffuser tube 5 to the flushing pipe 9 is discharged from the outlet 11 by air lift action, so that the pressure within the diffuser tube 5 is lowered and the intra-tank mixed liquor runs in the diffuser tube 5 via the blowholes 10. The result of this is that pulsation occurs in the diffuser tube 5 and the flushing pipe 9.

At the occurrence of pulsation, the pressure within the diffuser tube 5 varies with repeated subjection to sharp increase and decrease. This produces intermittent occurrences of a flushing state that the intra-tank mixed liquor flows to the diffuser tube 5 via the blowholes 10, and an air diffusion state that the flow of the intra-tank mixed liquor to the diffuser tube 5 is stopped and part of the air blows off via the blowholes 10.

At the point that the air diffusion state changes to the flushing state, a rapid flow of the intra-tank mixed liquor occurs in the diffuser tube 5. Repetitive occurrence of the rapid flow increases the effect of flushing the sludge attached to the inside of the diffuser tube 5.

The openings at the tip of the branch pipes 7 serve as the blowhole 10, the inner diameter of the branch pipes and the aperture of the blowhole 10 are the same. This provides a shape having no variations in the sectional area of the passage. Also, there is no resistance to obstruct the fluid passing through the inside of the branch pipes 7 and blowholes 10 to the exterior. Therefore, the sludge and intra-tank nixed liquor that remain in the branch pipes 7 when changing from the flushing state to the air diffusion state, are quickly discharged to the outside of the branch pipes 7 during air diffusion.

Thus, the controller 16 opens/closes the flushing valve 12 to automatically perform switching between the air diffusion operation and the flushing operation. Therefore, the flushing operation can be performed automatically at a particular time that waste water flow is below a predetermined value, or at predetermined time-spaced intervals.

The flushing operation at that particular time prevents excessive air diffusion that adversely affects the filtration membranes of the membrane separator 3, and also performs flushing of the diffuser tube 5. Further, even if a slight flow of waste water continues for a long period of time, the intra-tank mixed liquor is stirred in the air diffusion state to be produced intermittently, and oxygen can be supplied to activated sludge. In addition, in the flushing state, the intra-tank mixed liquor joins with air to flow together through the diffuser tube 5 and flushing pipe 9, so that sufficient oxygen is dissolved in the intra-tank mixed liquor. Therefore, by returning the intra-tank mixed liquor discharged from the flushing pipe 9 to the aeration tank 1, the oxygen supply to the intra-tank mixed liquor and the stirring of the intra-tank mixed liquor are performable even in the flushing state.

Thus, without repeating the operation of opening/closing of the flushing valve 12, once open the flushing valve 12, which is a simple manipulation, the diffuser tube 5 is subjected to repetitive flushing by using pulsation generated in the inside of the diffuser tube 5 and flushing pipe 9. This avoids that the main pipe 6, branch pipes 7 and blowholes 10 become clogged by dry sludge. As auxiliary facility, neither a flushing water tank nor a flushing pump is necessary, which have conventionally been required. This leads to a reduction in the load on the maintenance operator.

Although in this preferred embodiment the controller 16 controls to open/close the flushing valve 12, the open/close of the flushing valve 12 can be accomplished with manual operation.

Second Preferred Embodiment

Figure 4:
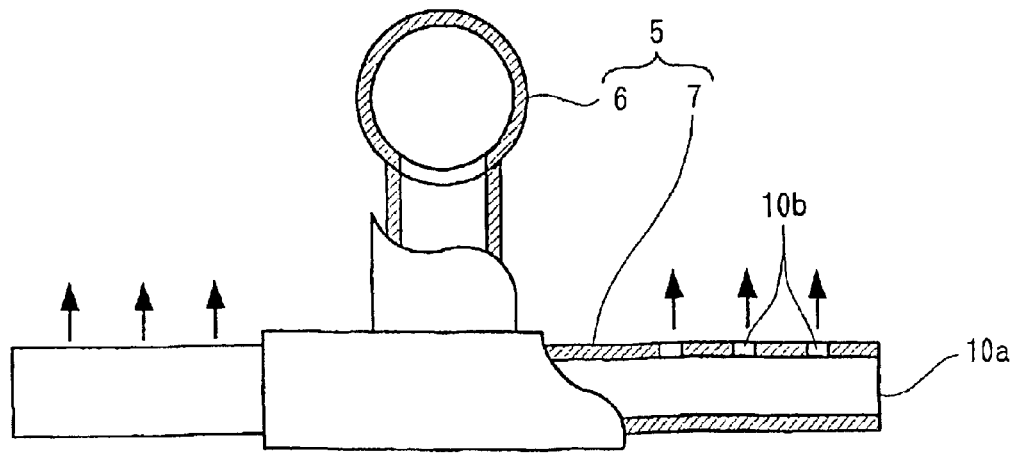
FIG. 4 is a sectional view of an important part of a diffuser tube according to other preferred embodiment of the invention.

A second preferred embodiment is basically identical with that shown in FIGS. 1 to 3 in the first preferred embodiment. FIG. 4 shows an important part of a diffuser tube 5 that is an important part of the second preferred embodiment. In the following, the same references have been used as in FIGS. 1 to 3, and their detail description is omitted.

Referring to FIG. 4, the diffuser tube 5 has branch pipes 7 in an inverted T-shape, which is communicated, at one end in its upper part, to the main pipe 6. The branch pipes 7 have an opening 10a locating at each end beneath the main pipe 6, and a plurality of blowholes 10b locating at its upper part and having a smaller aperture than the opening 10a.

Operation in the above construction will be described below. Air diffusion operation and flushing operation are performed in the same manipulation as the first preferred embodiment.

During air diffusion operation in which the flushing valve 12 is closed, the air to be supplied from the blower 8 to the diffuser tube 5 passes through the main pipe 6 to branch pipes 7, and the air then blows off from the blowholes 10b of the branch pipes 7 into the intra-tank mixed liquor in the aeration tank 1.

At this time, the air passing through the branch pipes 7 receives buoyancy due to a density difference with the intra-tank mixed liquor. Therefore, most of the air blows off from the blowholes 10b, and the rest is discharged from the opening 10a at the tip. Since the blowholes 10b have a small aperture, the small bubble (fine bubble) of the air blowing off therefrom has a small diameter, which increases the efficiency of oxygen dissolution. The improved efficiency of oxygen dissolution reduces the size of the blower 8 as an air source, thus permitting a reduction in power consumption.

It is necessary that the total amount of air diffused from the diffuser tube 5 be controlled to a predetermined amount. Therefore, as the aperture of the blowholes 10b is increased, the number of the blowholes 10b must be reduced. However, in the second preferred embodiment, the number of the blowholes 10b can be increased by reducing their aperture. Thereby, the degree of dispersion of the blowholes 10b in the aeration tank 1 can be increased to uniformly diffuse the aerated air and increase the effect of flushing the membrane surfaces of the membrane separator 3.

In addition, even if the blowholes 10b are spontaneously clogged by sundry matter, sludge of low flowability, large flock and the like, the air blowing off from the openings 10a at the tip of the branch pipes 7 ensures a predetermined amount of air for aeration to continue flushing of the membrane surfaces of the membrane separator 3. This avoids that the membrane cartridges become clogged by insufficient flushing before the next flushing operation.

During flushing operation, the intra-tank mixed liquor passing through the openings 10a at the tips of the branch pipes 7 and the blowholes 10b to the branch pipes 7. This intra-tank mixed liquor is joined with air to pass through the branch pipes 7 to the main pipe 6, while flushing the inside of the diffuser tube 5, and it is then joined with cumulus deposit within the diffuser tube to come off together from the outlet 11 via the flushing, pipe 9.

At this time, in the diffuser tube 5, the internal pressure of the main pipe 6 varies with repeated subjection to sharp increase and decrease. This provides repetitively rapid flow of the intra-tank mixed liquor to the branch pipes 7. As a result, the branch pipes 7, openings 10a and blowholes 10b are repetitively flushed for effective removal of sludge. This allows for a reduction in the aperture of the blowholes 10b of the branch pipes 7 that are liable to become clogged by dry sludge. Otherwise, the resulting effects are the same as the first preferred embodiment.

Third Preferred Embodiment

A third preferred embodiment has the same basic construction as that shown in FIGS. 1 to 3 in the first preferred embodiment. A diffuser tube 5 that is an important part of the third preferred embodiment will be described. In the following, the same references have been used as in FIGS. 1 to 3, and their detailed description is omitted.

Figure 5:
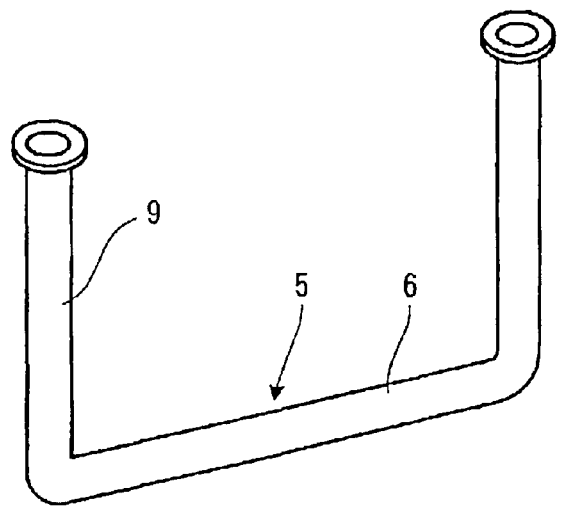
FIG. 5 is a perspective view of a diffuser tube according to other preferred embodiment of the invention.
Figure 6:
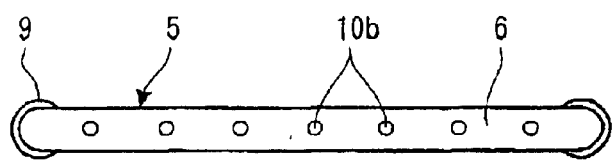
FIG. 6 is a bottom view of the diffuser tube in FIG. 5.
Figure 7:
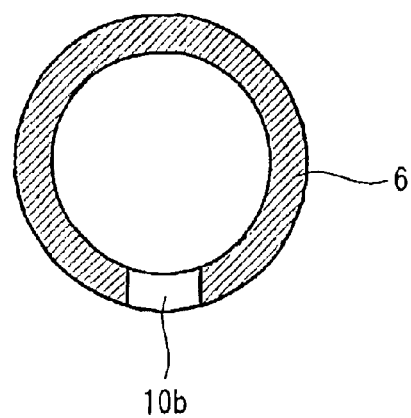
FIG. 7 is a sectional view of the diffuser tube in FIG. 5.

As shown in FIGS. 5 to 7, the diffuser tube 5 can be formed only by a main pipe 6, and a plurality of blowholes 10b are disposed in a lower part of the main pipe 6.

With this construction, during normal air diffusion operation, the air supplied from the blower 8 blows off from the blowholes 10b of the main pipe 6 to the intra-tank mixed liquor in the aeration tank 1, with the flushing valve 12 closed.

During flushing operation, in the state of supplying air of a predetermined pressure from the blower 8 to the main pipe 6, the flushing valve 12 is opened and the air supplied to the main pipe 6 is discharged under atmospheric pressure from the outlet 11 via the flushing pipe 9.

At this time, the outlet 11 is opened under atmospheric pressure at an upper position of the main pipe 6, and the blowholes 10b are opened at a lower position of the main pipe 6. Thereby, the main flow of the air flow in the main pipe 6 is directed to the outlet 11 having a smaller resistance, and the pressure (static pressure) exerted on the main pipe 6 is lowered. As a result, the intra-tank mixed liquor passes through the blowholes 10b to the inside of the main pipe 6. The entered intra-tank mixed liquor flowing along with the air passing through the main pipe 6 flushes the sludge attached to the inside of the main pipe 6, and then comes off together from the outlet 11 via the flushing pipe 9. Otherwise, the resulting effects are the same as the first preferred embodiment.

Figure 8:
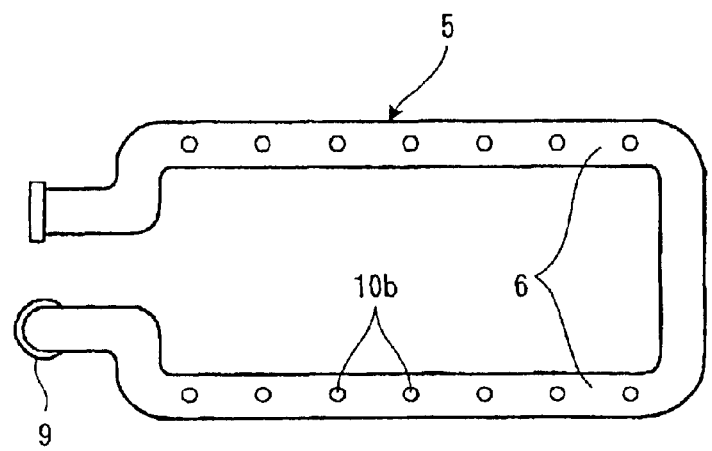
FIG. 8 is a bottom view of an air diffuser according to other preferred embodiment of the invention.
Figure 9:
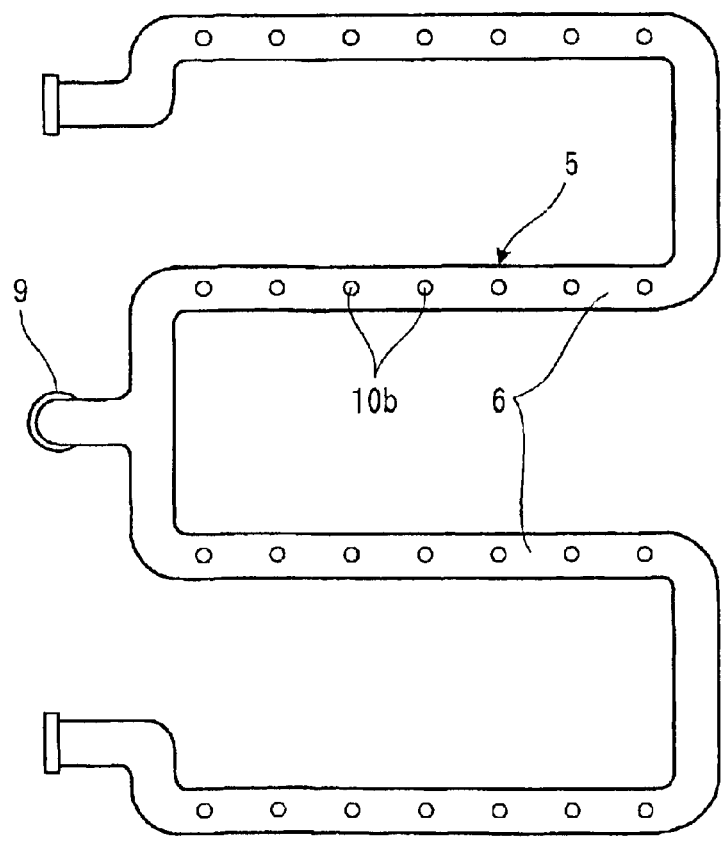
FIG. 9 is a bottom view of an air diffuser according to other preferred embodiment of the invention.
Figure 10:
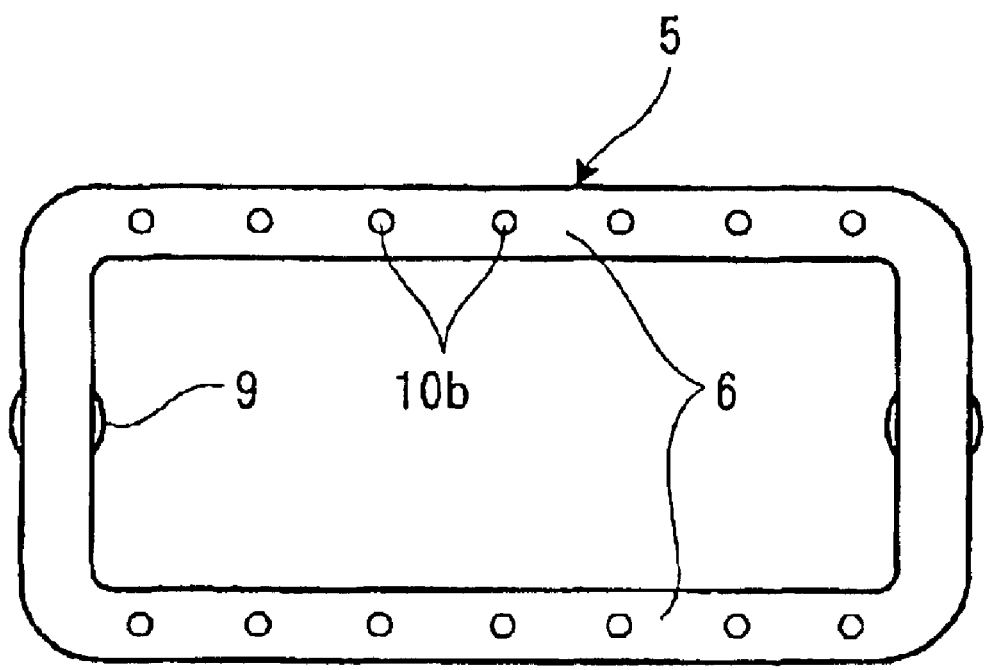
FIG. 10 is a bottom view of an air diffuser according to other preferred embodiment of the invention.
Figure 11:
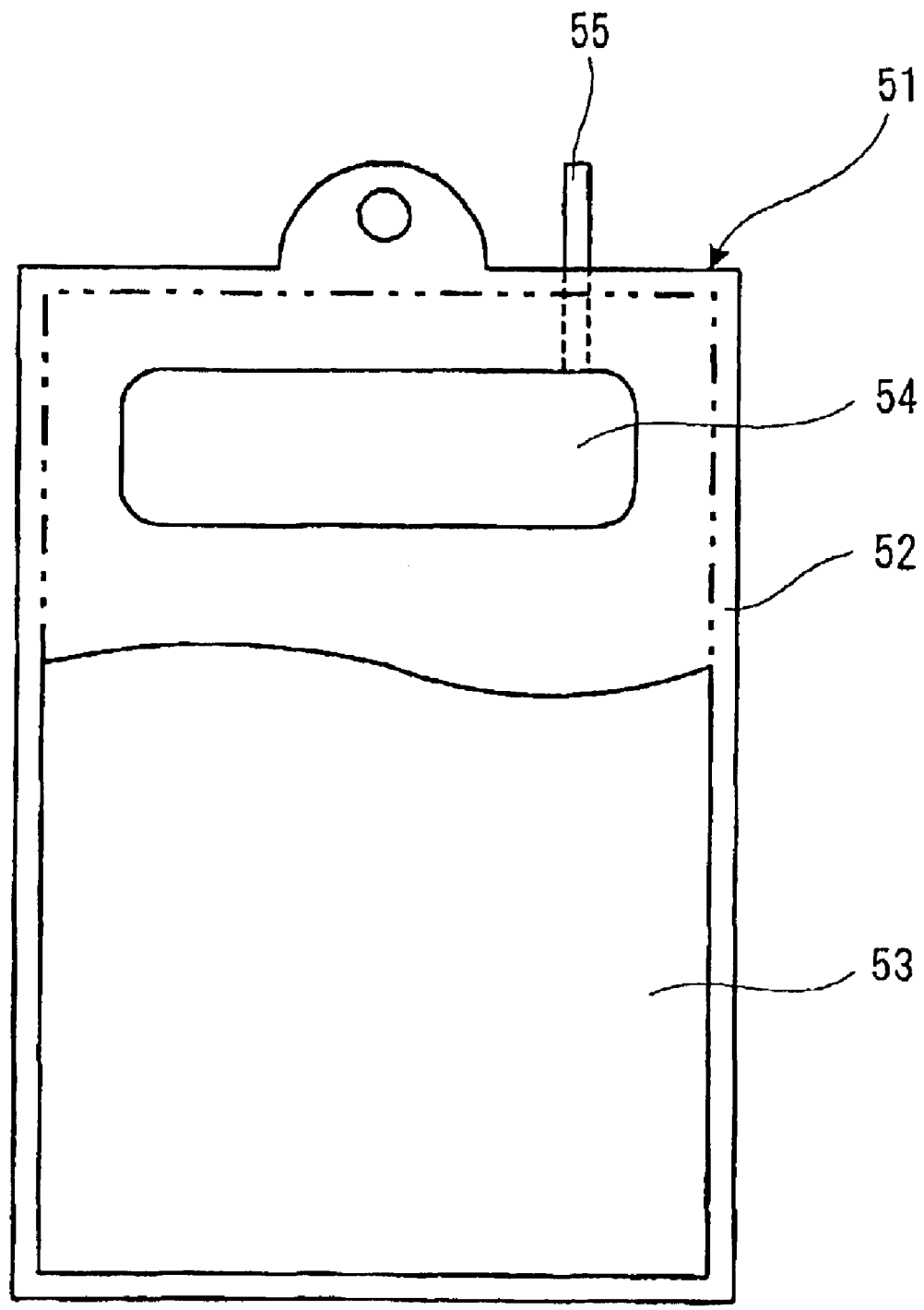
FIG. 11 is a front view of a membrane cartridge.

The diffuser tube 5 is preferably shaped according to the size of the aeration tank 1 or the size of the membrane separator 3. For example, the diffuser tube 5 can have the following shapes. Referring to FIG. 8, the main pipe 6 is formed in a U-shape. Referring to FIG. 9, the main pipe 6 is bent several times, and the flushing pipe 9 is connected to its intermediate point, and the air supply source is connected to its both ends. Referring to FIG. 10, the main pipe 6 is formed into a loop, and the flushing pipe 9 is connected to its intermediate point, and the air supply source is connected to the opposite position of the intermediate point.

While the invention has been shown and described in detail, the foregoing description is in all aspects illustrative and not restrictive. It is therefore understood that numerous modifications and variations can be devised without departing from the scope of the invention.

What is claimed is:

1. An air diffuser for use in a tank containing a mixed liquor, comprising:
    a diffuser tube immersed in the;
    a flushing pipe having an opening at its tip defining an outlet above the diffuser tube; and
    a flushing valve disposed in the flushing pipe,
    the diffuser tube having:
        a main pipe communicated at its basal end to an air supply source and communicated at its tip to the flushing pipe, the main pipe being located in a horizontal direction; and
        a plurality of blowholes provided at a lower part of the main pipe, characterized in that
    the flushing valve is opened while air is being supplied into the diffuser tube from the air supply source, the air supplied into the diffuser tube is evacuated through the flushing pipe, said mixed liquor inside the tank is refluxed into the diffuser tube through the blowholes following the evacuation of the air, and thus refluxed mixed liquor, together with the air forming a gas-liquid mixed phase flow, runs through the flushing pipe and evacuates therefrom, wherein the mixed liquor is refluxed intermittently into the diffuser tube while the flushing valve is open and air is supplied into the diffuser tube from the air supply source, said intermittent refluxing of the mixed liquor caused by variations in pressure inside the diffuser tube, thereby causing pulsation in the diffuser tube.

2. An air diffuser for use in a tank containing a mixed liquor, comprising:
    a diffuser tube immersed in a in the tank;
    a flushing pipe having an opening at its tip defining an outlet above the diffuser tube; and
    a flushing valve disposed in the flushing pipe,
    the diffuser tube having:
        a main pipe communicated at its basal end to an air supply source and communicated at its tip to the flushing pipe, the main pipe being located in a horizontal direction; and
        a plurality of branch pipes being communicated to the main pipes, each branch pipe having an opening at its tip defining a blowhole at a lower position of the main pipe characterized in that
    the flushing valve is opened while air is being supplied into the diffuser tube from the air supply source, the air supplied into the diffuser tube is evacuated through the flushing pipe, said mixed liquor inside the tank is refluxed into the diffuser tube through the blowholes following the evacuation of the air, and thus refluxed mixed liquor, together with the air forming a gas-liquid mixed phase flow, which runs through the flushing pipe and evacuates therefrom, wherein the mixed liquor is refluxed intermittently into the diffuser tube while the flushing valve is open and air is supplied into the diffuser tube from the air supply source, said intermittent refluxing of the mixed liquor caused by variations in pressure inside the diffuser tube, thereby causing pulsation in the diffuser tube.

3. An air diffuser for use in a tank containing a mixed liquor, comprising:
    a diffuser tube immersed in the tank;
    a flushing pipe having an opening at its tip defining an outlet above the diffuser tube; and
    a flushing valve disposed in the flushing pipe,
    the diffuser tube having:
        a main pipe communicated at its basal end to an air supply source and communicated at its tip to the flushing pipe the main pipe being located in a horizontal direction; and
        a plurality of branch pipes being communicated to the main pipe, each branch pipe having an opening at its tip at a lower position of the main pipe, and having at its upper part a plurality of blowholes each having an aperture smaller than the opening, characterized in that
    the flushing valve is opened while air is being supplied into the diffuser tube from the air supply source, the air supplied into the diffuser tube is evacuated through the flushing pipe, said mixed liquor inside the tank is refluxed into the diffuser tube through the blowholes following the evacuation of the air, and thus refluxed mixed liquor, together with the air forming a gas-liquid mixed phase flow, runs through the flushing pipe and evacuates therefrom, wherein the mixed liquor is refluxed intermittently into the diffuser tube while the flushing valve is open and air is supplied into the diffuser tube from the air supply source, said intermittent refluxing of the mixed liquor caused by variations in pressure inside the diffuser tube, thereby causing pulsation in the diffuser tube.

4. The air diffuser according to one of claims 1 to 3, further comprising:
    a sensor means to measure the amount of waste water flow to the tank; and
    a control means to open the flushing valve at a particular time when the sensor means detects that the quantity of waste water flow is below a predetermined value.

5. The air diffuser according to one of claims 1 to 3, further comprising;
    a control means to open the flushing valve at predetermined time-spaced intervals at which a timer is set.

6. A method of flushing an air diffuser for use in a tank containing a mixed liquor in which, air is supplied into a diffuser tube from its basal end and dispersed from a plurality of blowholes provided at a lower part of a horizontal piping forming the diffuser tube, the diffuser tube being immersed in a tank, characterized in that
    said method comprises the steps of:
    opening a flushing valve while air is being supplied into the diffuser tube;
    evacuating the air supplied into the diffuser tube through the flushing pipe;
    refluxing the mixed liquor inside the tank into the diffuser tube through the blowholes following the evacuation of the air;

causing the refluxed liquor to form, together with air, a gas-liquid mixed phase flow which runs through the flushing pipe and evacuates therefrom, and intermittently refluxing the mixed liquor into the diffuser tube while the flushing valve is open and air is being supplied into the diffuser tube, said intermittent refluxing of the mixed liquor caused by variations in pressure inside the diffuser tube, thereby causing pulsation in the diffuser tube.

7. An air diffuser for use in a tank containing a mixed liquor, comprising:

a diffuser tube immersed in the tank;

a flushing pipe having an opening at its tip defining an outlet above the diffuser tube; and a flushing valve disposed in the flushing pipe, the diffuser tube having:

a main pipe communicated at its basal end to an air supply source and communicated at its tip to the flushing pipe, the main pipe being located in a horizontal direction; and a plurality of blowholes provided at a lower part of the main pipe, characterized in that the flushing valve is opened while maintaining a supply of air into the diffuser tube from the air supply source, in response thereto the air diffuser alternating between (a) a first state wherein mixed liquor flows into the diffuser tube via the plurality of blowholes to produce a gas-liquid mixed phase flow, and (b) a second state wherein mixed liquor does not flow into the diffuser tube via the plurality of blowholes, said alternating first and second states caused by pressure changes inside the diffuser tube, the alternating first and second states causing pulsing in the diffuser tube.

8. An air diffuser according to claim 7, wherein the first state is a flushing state and the second state is an air evacuation state.

9. An air diffuser according to claim 7, wherein in the first state, pressure in said diffuser tube is lower than pressure in the tank.

* * * * *